March 22, 1966  J. L. AKERMAN, JR., ET AL  3,242,429
AIRBORNE TRACKING TRANSMITTER Filed April 25, 1963

INVENTORS
JOHN L. AKERMAN, JR. &
RUTHERFORD L. ELLIS, JR.
ATTORNEYS

3,242,429
AIRBORNE TRACKING TRANSMITTER
John L. Akerman, Jr., Vinings, and Rutherford L. Ellis, Jr., Atlanta, Ga., assignors to Aeroscience Electronics, Inc., a corporation of Georgia
Filed Apr. 25, 1963, Ser. No. 275,644
5 Claims. (Cl. 325—115)

This invention relates generally to position tracking through Doppler change detection, and more particularly to a transmitter means suited specifically for use as a tracking device in upper-atmosphere sounding rockets.

A tracking device of this sort must produce a constant frequency radio emission so that the Doppler change in the ground received frequency can be used for determining the velocity of the rocket. To yield satisfactory results, the transmitted frequency must have a stability in the order of better than six parts in a billion of the basic value, and this stability must be maintained throughout the rocket flight environment, which includes severe vibration, acceleration and temperature change conditions.

The vibration and acceleration loads encountered may be dealt with rather readily by careful selection and disposition of the components and by providing the assembled device with suitable structural strength and rigidity, but the temperature change conditions cannot be counteracted in any similar fashion and must instead be tolerated. Such temperature change tolerance, however, presents a critical difficulty in tracking device design, because the required frequency stability cannot be maintained without temperature control. Frequency stability of the order required dictates the use of a crystal oscillator unit of the type that has the crystal oscillator enclosed by a temperature controlled oven means (e.g., the Series RD–144 Crystal Oscillators presently supplied by Manson Laboratories, Incorporated, of Stamford, Connecticut). If the temperature change environment in which the tracking device must operate is allowed to affect an oscillator unit of this sort, the purpose of the oven means is destroyed and the stability of the unit is lost.

Figure 1:
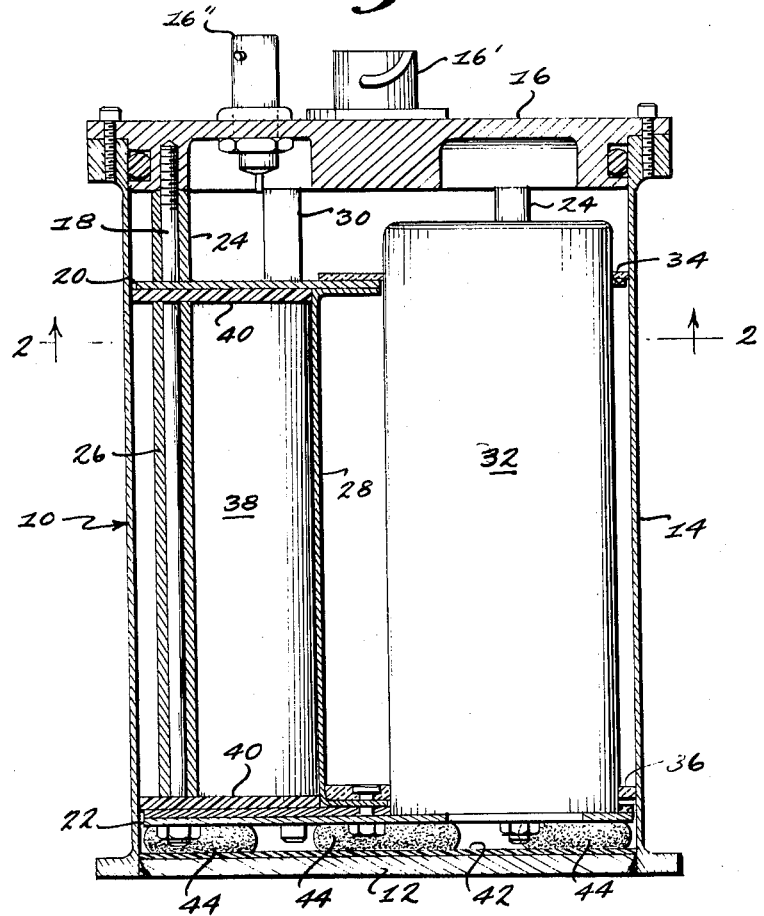
Figure 2:
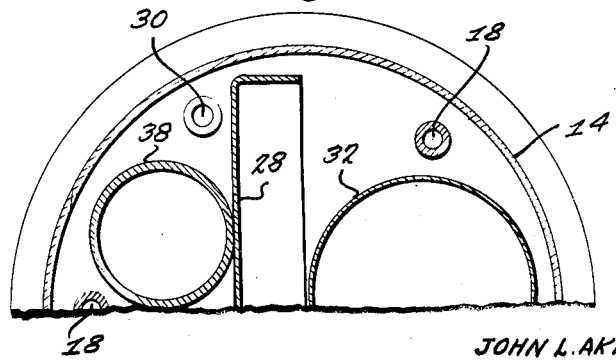

The present invention obviates this temperature control difficulty by a unique structural arrangement of the tracking device that prevents any significant temperature change influence from reaching the oscillator unit soon enough to cause difficulty. Briefly described, this structural arrangement is characterized by an extended thermal path to the mounting location of the oscillator unit, so that the thermal lag at this location exceeds the period during which the tracking device must remain operative. The manner of accomplishing this result according to the present invention is described in further detail below in connection with the accompanying drawings, in which:

FIG. 1 is a central vertical section illustrating the structural arrangement of a tracking transmitter embodying the present invention; and FIG. 2 is a horizontal half-section taken substantially at the line 2—2 in FIG. 1.

As illustrated in the drawings, a can-shaped container, indicated generally by the reference numeral 10, is provided to house the tracking device; this container 10 having a base portion 12 at which it will be secured on a bulkhead of the rocket structure in which the device is to be used, a relatively thin side wall structure 14 rising therefrom, and a closure lid 16 fixed in sealed relation at the top of the side wall structure 14 and fitted with appropriate connection gear as indicated at 16′ and 16″.

At the inner face of the closure lid 16 several elongated studs 18 are arranged to extend downwardly in a balanced pattern to carry and space top and bottom support plates 20 and 22 of a chassis assembly, suitable spacing sleeves 24 and 26 being disposed on the studs 18 to locate the plates 20 and 22 rigidly. The chassis assembly additionally comprises a main chassis member 28 secured in extending relation between the top and bottom plates 20 and 22 to carry the necessary electronic components (not shown) for a transistorized radio-frequency transmitter circuit. This main chassis 28 also provides central structural stiffening in the chassis assembly, and further short studs carrying spacer sleeves, as at 30, extend from the closure lid 16 to engage the top chassis plate 20 adjacent the main chassis 28 so that the central stiffening is related to the lid 16 as well.

All of the structural elements so far described are formed of a heat-conductive metal, suitably aluminum. Metal elements of this sort may be finished with sufficient brightness for adequate reflective protection against radiant heat transfer, but the aerodynamic heating that occurs during rocket flight spreads through the rocket structure by conduction, and this conductive transfer must be tolerated, as previously noted.

During use of the tracking device of the present invention heat enters by conduction at the base portion 12 of the container 10, from the rocket structure bulkhead to which it is attached, and travels up the side wall structure 14 to the closure lid 16. Until the conductive transfer has reached the lid 16 no conductive heating of the chassis assembly occurs, because the top and bottom plates 20 and 22 are arranged at a slight side wall clearance. It should also be noted in this connection that no convective heat transfer is possible after the initial, relatively short, powered flight having a duration of about one minute, for as soon as the rocket leaves the lower atmosphere it reaches a free-fall state and assumes a weightless condition that renders convection impossible throughout the remainder of the flight until shortly before impact.

Accordingly, all significant heating of the interiorly disposed chassis assembly comes by way of conduction from the container lid 16 through the securing studs 18 and 30 to the top support plate 20 first and then on downwardly through the studs 18 and the main chassis 28 so as eventually to reach the bottom support plate 22. By this arrangement a substantial thermal lag is obtained at the bottom support plate 22, and this result is taken advantage of according to the present invention by using the bottom plate 22 as the mounting location for the oscillator unit, which is represented in the drawings as designated by the reference numeral 32.

The oscillator unit 32 is attached firmly to the bottom plate 22 so that it stands uprightly in an extent reaching above the level of the top plate 20, which is apertured to clear such disposition and has a non-metallic spacer element 34 secured thereat to support the oscillator unit 32 laterally adjacent its top end, as well as to brace the chassis assembly laterally against the container sidewall. Comparable lateral bracing is afforded adjacent the bottom plate 22 by a further spacing element 36 that is also made to serve as the base of a printed circuit board.

As a tracking device of the present sort must be self-contained, the chassis assembly is also arranged to accommodate batteries at 38 between the top and bottom support plates 20 and 22 at the side of the main chassis 28 opposite the oscillator unit. Spacer elements 40 are also provided adjacent both ends of the batteries 38 for supporting them laterally and bracing the chassis. For suitable strength and insulating properties, all of the spacer elements 34, 36 and 40 are preferably formed of an epoxy-bonded, glass fiber material. A layer of epoxy insulating material, as at 42, is also preferably provided on the inner face of the container base portion 12, and rubber cushioning pads 44 are advantageously disposed beneath the bottom plate 22 of the chassis assembly.

Upon assembly of the device with the foregoing structural arrangement, the thermal path through which conductive heat must travel to affect operation of the oscillator unit 32 adversely exceeds twice the height of the container 10, and the thermal lag that results from a path of such extent (e.g., about 13½ inches in a representative tracking device of the type being considered) will exceed by a good margin the duration of a sounding rocket flight.

This invention has been described in detail above for purposes of illustration only and is not intended to be limited by this description or otherwise except as defined in the appended claims.

We claim:

1. A tracking transmitter of the character described comprising a self-contained transmitter means incorporating a chassis assembly and an oscillator unit requiring a controlled temperature environment, a container for said transmitter means having a closure lid secured thereon, mounting means secured to said lid and extending into said container, means securing said chassis assembly to said mounting means within said container in spaced relation to said lid to provide a thermal lag path through said mounting means, means spacing said transmitter means rigidly within said container and in thermally insulated relation thereto, and means mounting said oscillator unit on said chassis assembly remotely with respect to said lid to extend the length of said thermal lag path between said container lid and said oscillator unit.

2. A tracking transmitter of the character described comprising a self-contained transmitter means incorporating a heat-conductive, metal chassis assembly and an oscillator unit requiring controlled temperature conditions, a heat-conductive, metal container for said transmitter means formed with a base, a relatively thin side wall structure, and a lid fixed in sealed relation on said side wall structure, mounting means secured to said lid and extending into said container, means securing said chassis assembly to said mounting means within said container in spaced relation to said lid to provide a thermal lag path through said mounting means, means spacing said transmitter means rigidly and in thermally insulated relation with respect to the side wall structure and base of said container, and means mounting said oscillator unit on said chassis assembly remotely with respect to said lid to extend the length of said thermal lag path between said container lid and said oscillator unit.

3. A tracking transmitter as defined in claim 2 and further characterized in that said chassis assembly includes top and bottom plates, said mounting means comprises stud elements extending from said lid and engaging said top and bottom plates, and said oscillator unit is mounted on said bottom plate.

4. A tracking transmitter as defined in claim 2 and further characterized in that said oscillator unit comprises a temperature controlled oven means enclosing a crystal oscillator.

5. A tracking transmitter as defined in claim 2 and further characterized in that said transmitter means additionally incorporates batteries, and in that said chassis assembly is adapted to carry a transistorized radio-frequency transmitter circuitry.

References Cited by the Examiner
UNITED STATES PATENTS

| 2,604,582 | 7/1952 | Hauck et al. | 325—119 |
| 3,028,486 | 4/1962 | Rossi | 325—119 X |
| 3,041,549 | 6/1962 | Keen et al. | 331—69 |
| 3,152,304 | 10/1964 | Ringer et al. | 325—119 X |
| 3,158,821 | 11/1964 | Sulzer | 331—69 |

DAVID G. REDINBAUGH, *Primary Examiner.*

J. W. CALDWELL, *Assistant Examiner.*